United States Patent
Hamm et al.

(10) Patent No.: US 10,946,965 B2
(45) Date of Patent: Mar. 16, 2021

(54) GAP ACCESSARY DEVICE FOR ELEVATED ROLLER RAILS

(71) Applicants: David Hamm, Lexington Park, MD (US); Michele Hoefer, California, MD (US); Michael Jackson, California, MD (US); Bennett Myres, Lexington Park, MD (US)

(72) Inventors: David Hamm, Lexington Park, MD (US); Michele Hoefer, California, MD (US); Michael Jackson, California, MD (US); Bennett Myres, Lexington Park, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/448,251

(22) Filed: Jun. 21, 2019

(65) Prior Publication Data
US 2020/0398987 A1 Dec. 24, 2020

(51) Int. Cl.
*B64D 9/00* (2006.01)
*B65G 39/18* (2006.01)
*B65G 13/11* (2006.01)

(52) U.S. Cl.
CPC ............... *B64D 9/00* (2013.01); *B65G 13/11* (2013.01); *B65G 39/18* (2013.01); *B64D 2009/006* (2013.01)

(58) Field of Classification Search
CPC .... B64D 9/003; B64D 9/00; B64D 2009/006; B64D 1/10; B64D 1/08; B64D 11/00; B64D 11/0696; B65G 13/06; B65G 63/002; B65G 63/022; B65G 67/04; B65G 67/20; B65G 13/12; B65G 1/02; B65G 35/04
USPC .................... 410/92, 77, 80, 69, 95, 90, 89; 244/137.1, 118.1, 137.3, 133
See application file for complete search history.

(56) References Cited

U.S. PATENT DOCUMENTS

| | | | |
|---|---|---|---|
| 7,556,462 B2 * | 7/2009 | Huber | B64C 1/20 410/77 |
| 8,109,702 B2 * | 2/2012 | Stegmiller | B64D 9/00 410/92 |
| 8,585,334 B2 * | 11/2013 | Moradians | B64D 9/003 410/80 |
| 2011/0222983 A1 * | 9/2011 | Dugic | B60P 7/0807 410/92 |

* cited by examiner

*Primary Examiner* — D Glenn Dayoan
*Assistant Examiner* — Sunsurraye Westbrook
(74) *Attorney, Agent, or Firm* — Mark O. Glut; NAWCAD

(57) ABSTRACT

The invention is a gap accessary device for elevated roller rails disposed on a platform floor. The device includes a housing, fingers, tangs, roller support structures, rollers, a first curved truncated inclined plane, and a second curved truncated inclined plane. The device allows cargo to enter a platform without catching on the platform threshold and requires less effort to load cargo onto a platform with elevated roller rails.

1 Claim, 6 Drawing Sheets

GAP ACCESSARY DEVICE FOR ELEVATED ROLLER RAILS

STATEMENT OF GOVERNMENT INTEREST

The invention described herein may be manufactured and used by or for the Government of the United States of America for governmental purposes without payment of any royalties thereon or therefor.

BACKGROUND

The V-22 aircraft has two rows of roller rails continuing lengthwise through the aircraft cabin. Recently, these roller rails have been modified so that they are now compatible with various flooring modifications. As a result, there is now a gap between the rails on the ramp and the rails within the aft cabin. This gap causes cargo to dip down and become wedged under the edge of the elevated roller rails, making it impossible to move the cargo further into the cabin without damaging the pallet, cargo, or aircraft.

SUMMARY

The present invention is directed to a gap accessary device for elevated roller rails that meets the needs listed above and below.

It is a feature of the present invention to provide a gap accessary device for elevated roller rails that allows cargo to be easily moved into an aircraft, particularly a V-22, and through and past the gap between the rails on the ramp and the rails within the aft cabin, without damage to the cargo, pallet, or aircraft.

It is a feature of the present invention to provide a gap accessary device for elevated roller rails that reduces the friction force required for cargo and a corresponding pallet to traverse the gap between the rails on the ramp and the rails within the aft cabin.

It is a feature of the present invention to provide a gap accessary device for elevated roller rails that utilizes the current geometry of the gap and does not require any additional hardware or fasteners.

It is a feature of the present invention to provide a gap accessary device for elevated roller rails that greatly reduces the effort and manpower required to load cargo onto a platform, specifically the V-22 aircraft.

DRAWINGS

These and other features, aspects and advantages of the present invention will become better understood with reference to the following description and appended claims, and accompanying drawings wherein:

DESCRIPTION

Figure 1:
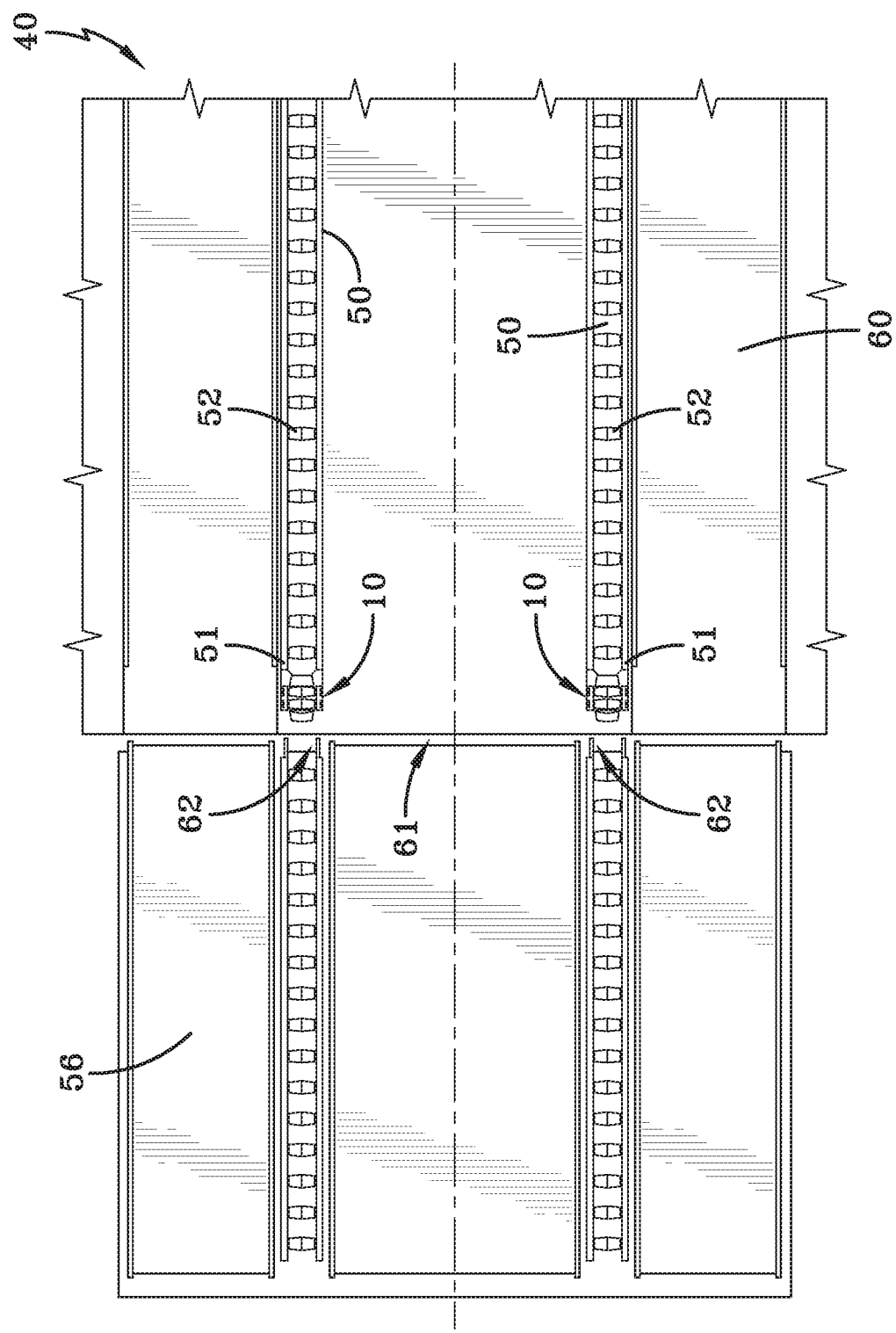
FIG. 1 is a top view of the platform floor of a platform.
Figure 2:
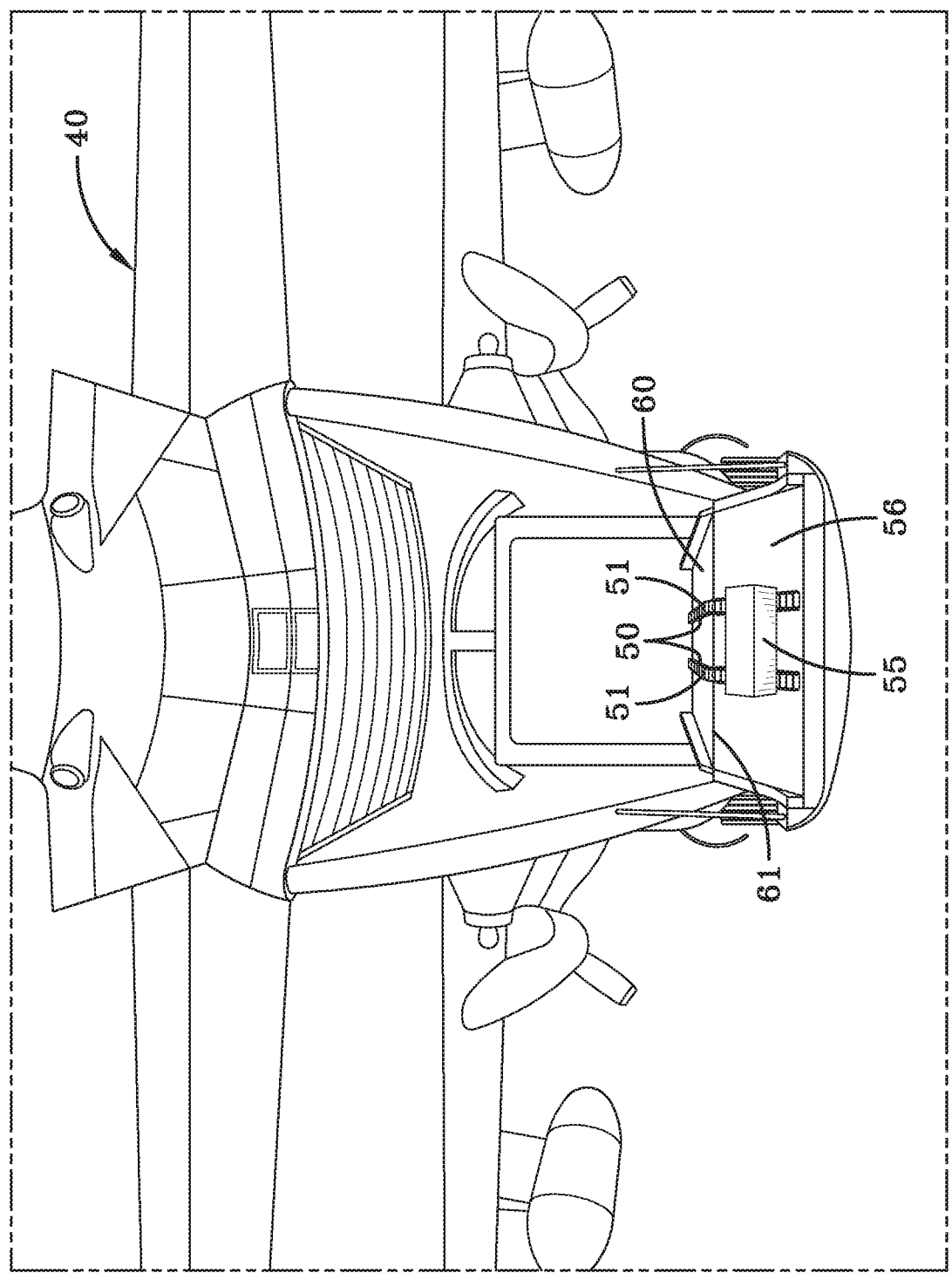
FIG. 2 is a perspective view of the platform in use with a ramp.
Figure 3:
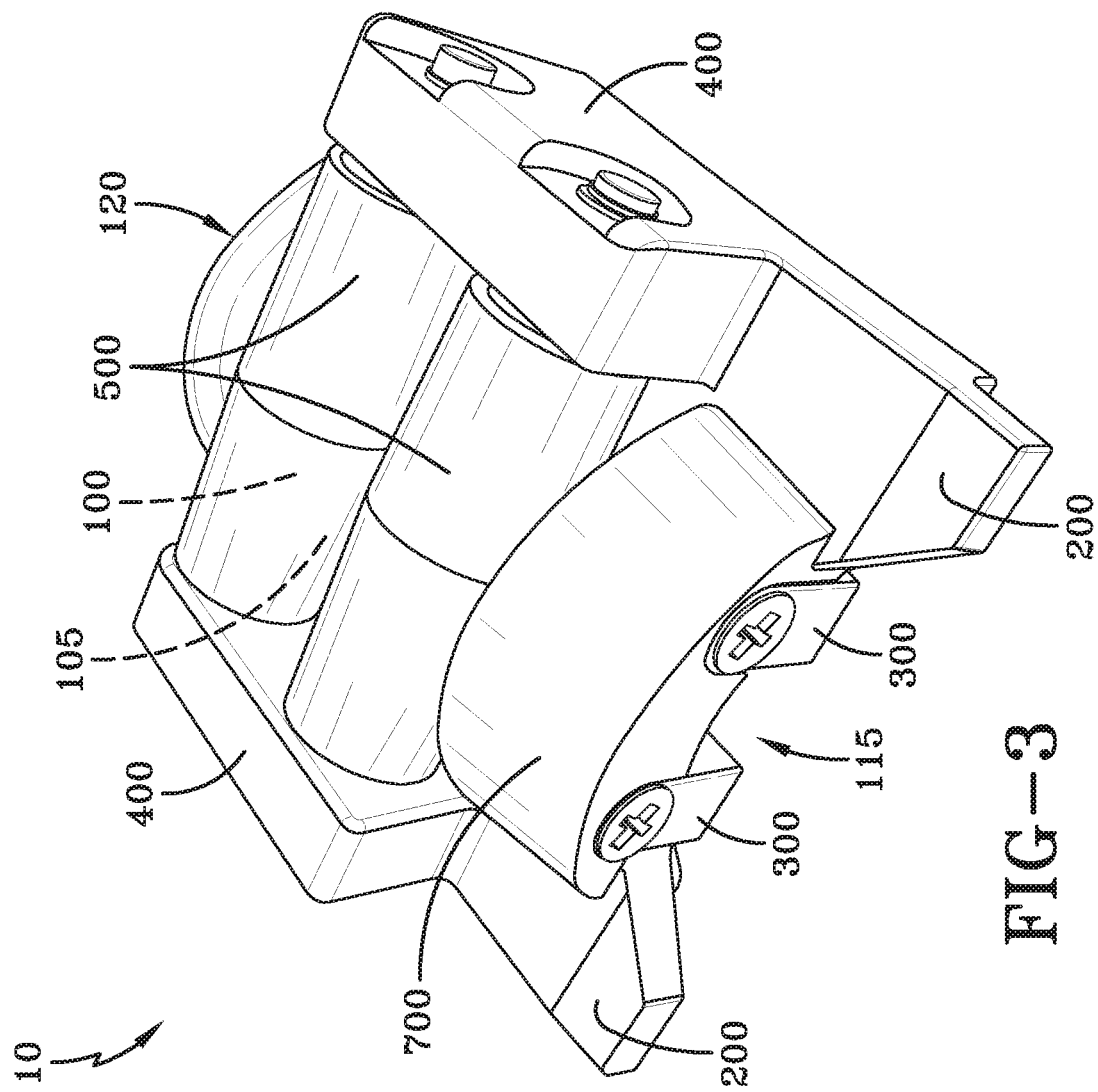
FIG. 3 is a perspective view of the gap accessary device with hardware installed.
Figure 4:
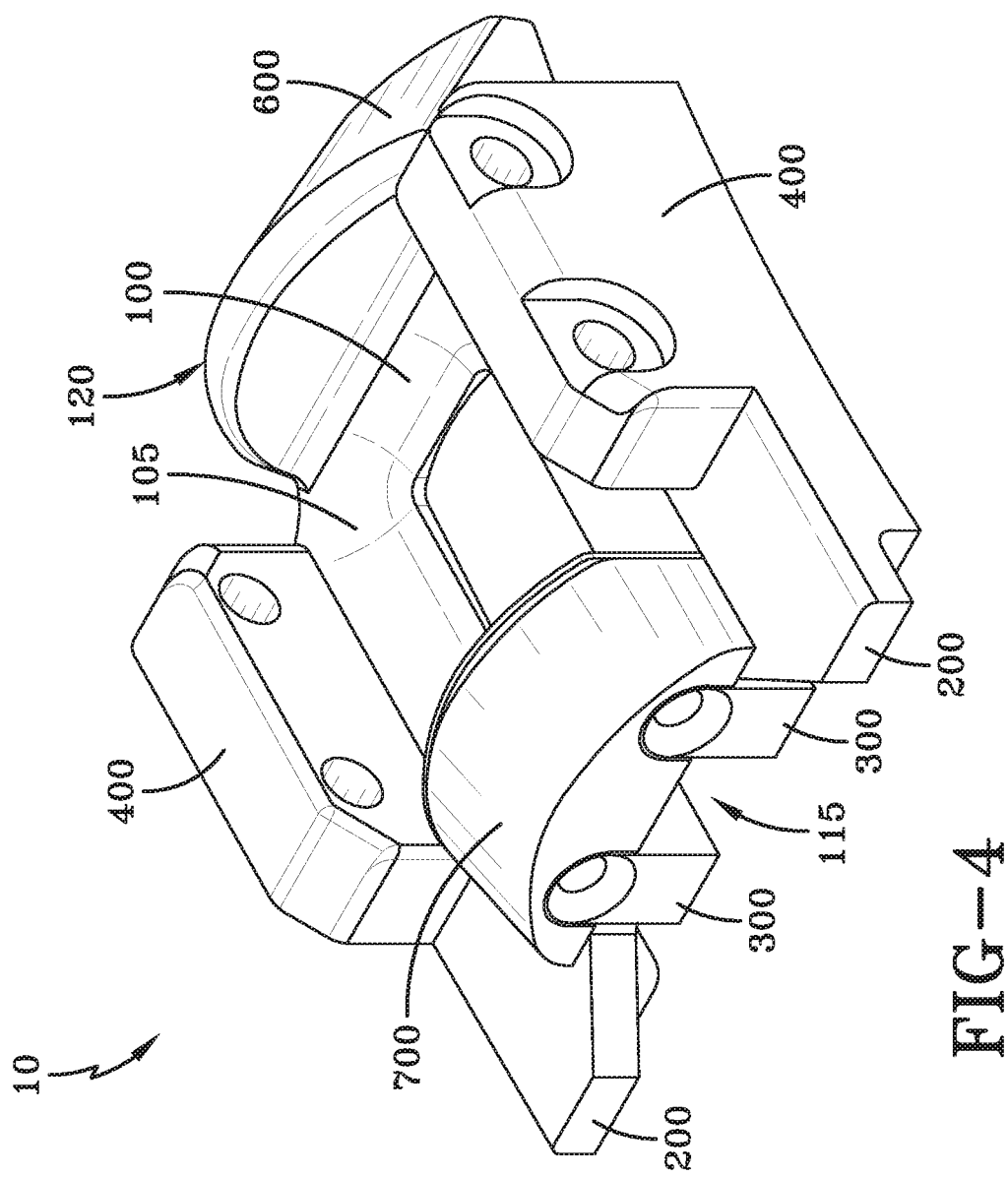
FIG. 4 is a top perspective view of the gap accessary device without hardware installed.
Figure 5:
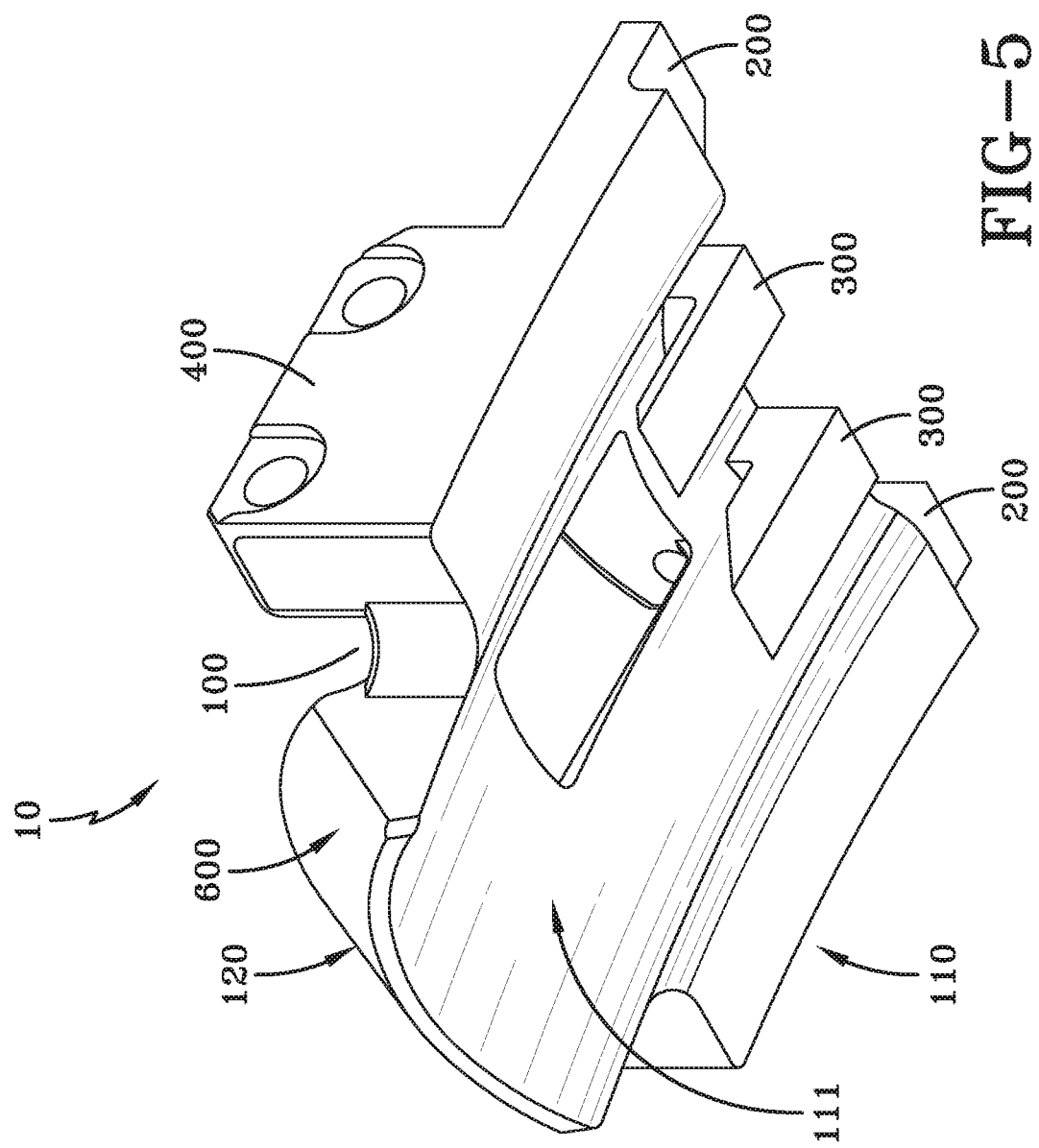
FIG. 5 is a bottom perspective view of the gap accessary device.
Figure 6:
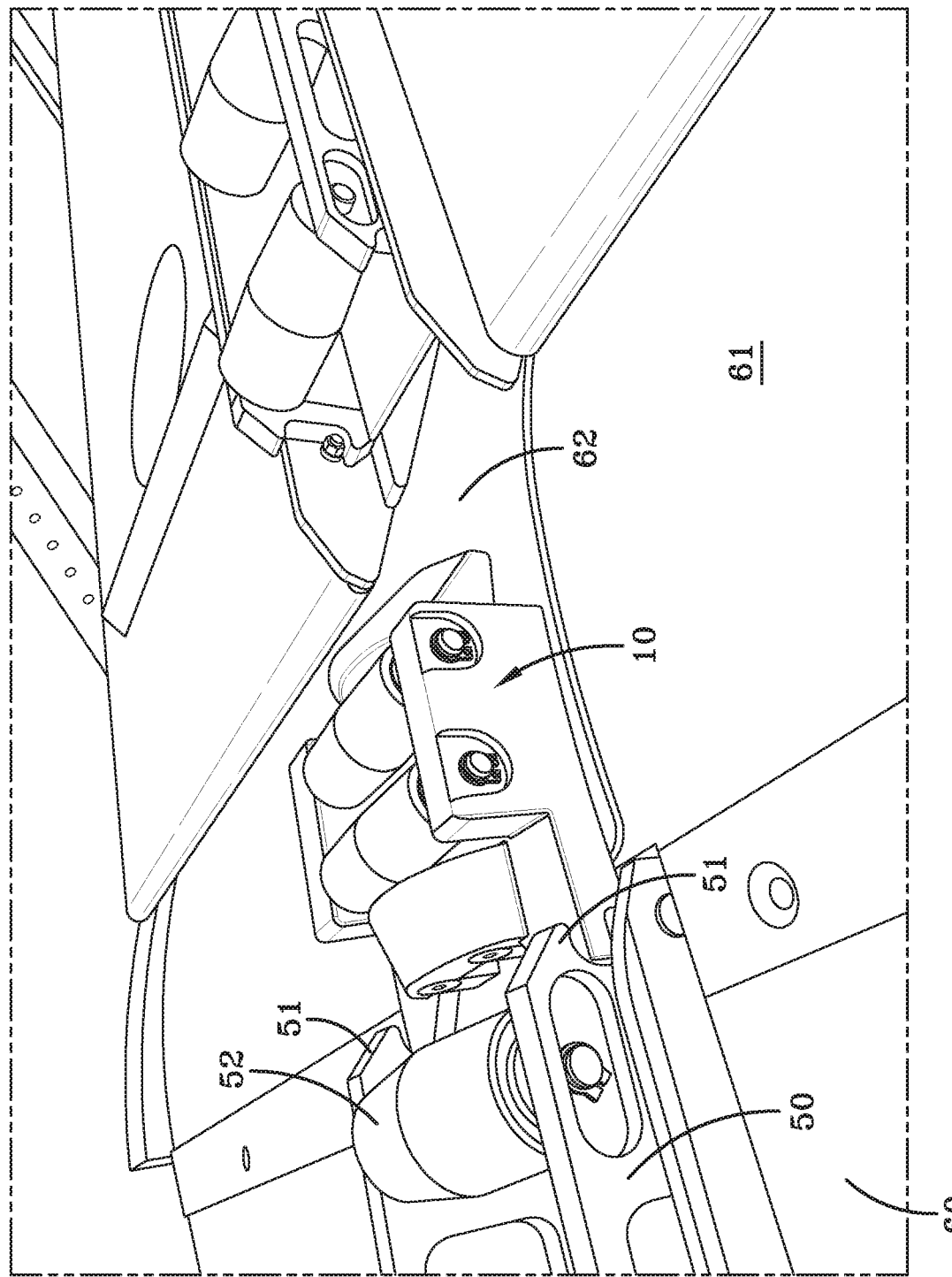
FIG. 6 is a perspective view of the gap accessary device in use.

The preferred embodiments of the present invention are illustrated by way of example below and as shown in FIGS. 1-6. As shown in FIGS. 1-6, a gap accessary device 10 for elevated roller rails 50 disposed on a platform floor 60, includes a housing 100, fingers 200, tangs 300, roller support structures 400, rollers 500, a first curved truncated inclined plane 600, and a second curved truncated inclined plane 700. As shown in FIGS. 1, 2, and 6, each elevated roller rail 50 has a roller rail end lip 51 and elevated roller rail rollers 52 for moving cargo 55 on the platform floor 60, while the platform floor 60 includes a platform threshold 61, where typically a ramp 56 meets the platform in order to load cargo 55 into the platform 40. As shown in FIGS. 3, 4 and 5, the housing 100 includes with a top portion 105, a bottom portion 110, a forward end 115 (facing the front of the platform 40), and a rear end 120 (facing the rear of the platform 40). The bottom portion 110 includes a bottom face 111 that interfaces and corresponds to the platform threshold 61. In the V-22, the platform threshold 61 includes a bump 62, and in the V-22 variant of the gap accessary device 10, the bottom face 111 is contoured to the bump 62. There are preferably two fingers 200, and they extend from the housing 100 at the forward end 115 and are attached to the housing 100 such that the fingers 200, when engaged with the elevated roller rails end lip 51, prevent vertical movement and forward longitudinal movement of the gap accessary device 10. There are preferably two tangs 300, which are disposed at the forward end 115 at the bottom face 111, proceeding aftward and are attached to the housing 100. The tangs 300 are attachable to the threshold lip 62 such that when the tangs 300 are attached to the threshold lip 62, the tangs 300 prevent vertical movement, lateral movement, and aft longitudinal movement of the gap accessary device. There are preferably two roller support structures 400 that are disposed at the top portion 105, at opposite sides of the gap accessary device 10, and are attached to the housing 100. The rollers 500 are disposed within the roller support structures 400 such that the roller support structures 400 hold the rollers 500 in place and allow circular motion of the rollers 500 in same direction as the elevated roller rail rollers 52. The first curved truncated inclined plane 600 is located at and attached to the rear end 120 of the housing 100, and when the gap accessary device 10 is in use the first curved truncated inclined plane 600 prevents moving cargo pallets 55 that are placed into the platform 40 from catching on the roller rail end lip 51. The second curved truncated inclined plane 700 is located at and attached to the forward end 115 of the housing 100, and allows cargo pallets 55 to be pushed onto the elevated roller rails 50.

A platform 40 can be defined, but without limitation, as any structure or vehicle. In particular, in a military environment, a platform 40 is a structure or vehicle that houses or bears people, cargo, or weapons. A platform threshold 61 can be defined, but without limitation as a strip of wood, metal, stone or any material forming the bottom of an entranceway and crossed when entering a platform 40, in this case, into the cargo bay of a V-22 aircraft.

This invention, in particular, can be utilized on the V-22 aircraft, but can be used on any other military or civilian use platform. In the description of the present invention, the invention will be discussed in a military aircraft environment; however, this invention can be utilized for any type of application that requires use of a gap accessary device.

The gap accessary device 10 can be manufactured from metal, alloys, plastics, ceramics, or a combination thereof. The device 10 can be manufactured, but without limitation, utilizing a 3-D printer.

When introducing elements of the present invention or the preferred embodiment(s) thereof, the articles "a," "an,"

"the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A gap accessory device for elevated roller rails disposed on a platform floor of a platform, each elevated roller rail having a roller rail end lip and elevated roller rail rollers for moving cargo on the platform floor, the platform floor including a platform threshold and a threshold lip, the device comprising:

a housing with a top portion, a bottom portion, a forward end, and a rear end, the bottom portion including a bottom face that interfaces and corresponds to the platform threshold;

fingers extending from the housing at the forward end and attached to the housing such that the fingers when engaged with the elevated roller rails end lip prevent vertical movement and forward longitudinal movement of the gap accessory device;

tangs disposed at the forward end, proceeding aftward, and attached to the housing, the tangs attachable to the threshold lip such that when the tangs are attached to the threshold lip the tangs prevent vertical movement, lateral movement, and aft longitudinal movement of the gap accessory device;

roller support structures disposed at the top portion and attached to the housing;

rollers, the rollers disposed within the roller support structures such that the roller support structures hold the rollers in place and allow circular motion of the rollers in same direction as the elevated roller rail rollers;

a first curved truncated inclined plane located at and attached to the rear end of the housing, such that when the gap accessory device is in use the first curved truncated inclined plane prevents moving cargo pallets that are placed into the platform from catching on the roller rail end lip; and, a second curved truncated inclined plane located at and attached to the forward end of the housing, such that the second curved truncated inclined plane allowing cargo pallets to roll onto the elevated roller rails.

* * * * *